United States Patent [19]
Watanabe et al.

[11] Patent Number: 5,354,628
[45] Date of Patent: Oct. 11, 1994

[54] HERMETICALLY SEALED CELL COMPRISING LIQUID ACTIVE MATERIAL

[75] Inventors: Osamu Watanabe; Kaoru Hisatomi; Kazuo Ishida; Akira Kishida, all of Osaka; Yasunori Okuzono, Yokohama, all of Japan

[73] Assignee: Hitachi Maxell, Ltd., Osaka, Japan

[21] Appl. No.: 107,974

[22] Filed: Aug. 18, 1993

[30] Foreign Application Priority Data

Aug. 19, 1992 [JP] Japan .................... 4-244279

[51] Int. Cl.⁵ ............... H01M 10/40; H01M 2/12
[52] U.S. Cl. ................... 429/56; 429/101; 429/194
[58] Field of Search ............ 429/101, 194, 196, 197, 429/66, 53, 56, 57

[56] References Cited

U.S. PATENT DOCUMENTS

| | | | |
|---|---|---|---|
| 4,587,180 | 5/1986 | Hara et al. | 429/8 |
| 5,030,525 | 7/1991 | Hisatomi et al. | 429/101 |

FOREIGN PATENT DOCUMENTS

| | | |
|---|---|---|
| 0413297 | 2/1991 | European Pat. Off. . |
| 2499771 | 8/1982 | France . |
| 1086444 | 3/1989 | Japan . |
| 1319248 | 12/1989 | Japan . |
| 3152856 | 6/1991 | Japan . |
| 4242069 | 8/1992 | Japan . |
| 786781 | 1/1957 | United Kingdom . |

*Primary Examiner*—Anthony Skapars
*Attorney, Agent, or Firm*—Birch, Stewart, Kolasch & Birch

[57] ABSTRACT

A hermetically sealed liquid active material cell having an oxyhalide compound which is in a liquid state at room temperature as a positive active material, a negative electrode which contains at least one alkali metal, a cell container which has a thin-wall part in its bottom for explosion-proofing, and a hermetic seal which closes an opening of the cell container, in which the cell further has a resinous ring on an inner surface of the bottom of the cell container, which cell has improved explosion-proof performance.

6 Claims, 5 Drawing Sheets

HERMETICALLY SEALED CELL COMPRISING LIQUID ACTIVE MATERIAL

BACKGROUND OF THE INVENTION

1. Field of the Invention

The present invention relates to an explosion-proof hermetically sealed cell comprising a liquid active material. In particular, the present invention relates to a hermetically sealed cell comprising a liquid active material, which cell has improved actuation-reliability of an explosion-proof mechanism.

2. Description of the Related Art

In a so-called liquid active material cell comprising an oxyhalide compound which is in a liquid state at room temperature (e.g., thionyl chloride, sulfuryl chloride, phosphoryl chloride, etc.) as a positive active material and a negative electrode which comprises an alkali metal (e.g., lithium, sodium and potassium) and their alloy, since the positive active material and the negative electrode material are both reactive with water, a hermetic seal is used to close an opening of a cell container for containing those materials to increase sealing tightness.

The cell utilizing the hermetic seal has an advantage that it is tightly closed and has a good shelf life. But, when the cell is exposed to abnormal conditions, such as a high temperature or charging under a high voltage, the internal pressure of the cell abnormally increases and, in an extreme case, the cell bursts with a loud noise because of the tight seal, so that the contents of the cell are scattered around and will contaminate an the equipment using the cell.

To avoid bursting of the cell, an explosion-proof mechanism is provided in the cell. For example, as shown in FIG. 1, a thin-wall part 4 in the form of a cross is provided by grooves at the bottom 2 of cell 1. A center part of the bottom protrudes as 2a. The cell comprises a negative electrode 11, a separator 12, a positive electrode 13, an electrolyte liquid 14, a positive current collector 15, and a cell lid 16. The cell lid 16 comprises a body 17, an insulating layer 18 and a positive terminal 19. The cell further comprises a bottom insulating material 20, an upper insulating material 21 and a resin layer 22.

However, the cell is not necessarily used under expected conditions, but it may be exposed to unexpected conditions even when it is installed in equipment which uses the cell. Therefore, the cell should be designed so that it is safe under such unexpected conditions.

After shipping, a user installs the cell on a printed circuit board. In such a case, a free end of an external lead wire, which is connected to the cell by, for example, laser beam spot welding before shipping, is dipped in a solder bath containing molten solder, and then the cell is connected to the printed circuit board using the solder. In the soldering step, even if the cell is accidentally dropped in the solder bath, and a large amount of heat is applied to the cell so that the cell is very quickly heated, the cell should be safe by the actuation of the explosion-proof mechanism.

To confirm the safety of the cell when the cell is dropped in the solder bath accidentally, the cell was intentionally dropped in the solder bath, and it was found that, the thin-walled part was broken by the increase of internal pressure, and a part of lithium was made molten since the temperature rose quickly, so that the molten lithium flowed out from the broken thin-walled part together with the electrolyte liquid. Then, the molten lithium was ignited, and in turn the cell burst due to generated high pressure.

To secure the reliable actuation of the explosion-proof mechanism, it may be contemplated to reduce the thickness of the thin-wall part of the cell bottom so that the thin-wall part is completely broken before the lithium becomes molten. However, when the thickness of the thin-wall part is reduced to about 0.04 $\mu$m, a mold for press molding the thin-wall part becomes heavily worn, and the molding cannot be carried out stably for a long time.

Further, when the lead wire is connected to the cell, the lead wire having a ring-form terminal is bonded to the bottom of the cell container by spot welding. In this welding step, if a position of the ring-form terminal shifts so that the cell container is directly heated by the welding heat, the lithium negative electrode, which is press bonded to the container, is made molten, and a cell reaction proceeds at once, so that the cell may burst by the volume expansion due to heat generation.

SUMMARY OF THE INVENTION

One object of the present invention is to provide a hermetically sealed cell comprising a liquid active material, which does not burst when it is very quickly heated by high temperature.

Another object of the present invention is to provide a hermetically sealed cell comprising a liquid active material and an explosion-proof mechanism which functions through the breakage of a thin wall part, wherein reliability of the explosion-proof mechanism is improved to increase the safety of the cell.

According to the present invention, there is provided a hermetically sealed liquid active material cell comprising an oxyhalide compound which is in a liquid state at room temperature as a positive active material, a negative electrode which comprises at least one alkali metal, a cell container which has a thin-wall part in its bottom for explosion-proofing, and a hermetic seal which closes an opening of the cell container, wherein the cell further comprises a resinous ring on an inner surface of the bottom of the cell container.

The resinous ring separates the alkali metal negative electrode and the container bottom. When the cell is heated to a high temperature and a part of the alkali metal electrode is made molten, leakage of the molten alkali metal through a gap formed in the thin-wall part of the bottom by breakage is prevented. Thereby, the explosion-proof mechanism of the thin-wall part is actuated properly, and bursting of the cell under high pressure is prevented, so that the safety of the cell is 175 maintained.

Furthermore, if the position of the ring-formed terminal of the lead wire shifts when it is welded to the bottom of the cell container, the welding head does not heat the alkali metal negative electrode directly because of the presence of the resinous ring.

DETAILED DESCRIPTION OF THE INVENTION

The present invention will be explained by making reference to the accompanying drawings.

Figure 2:
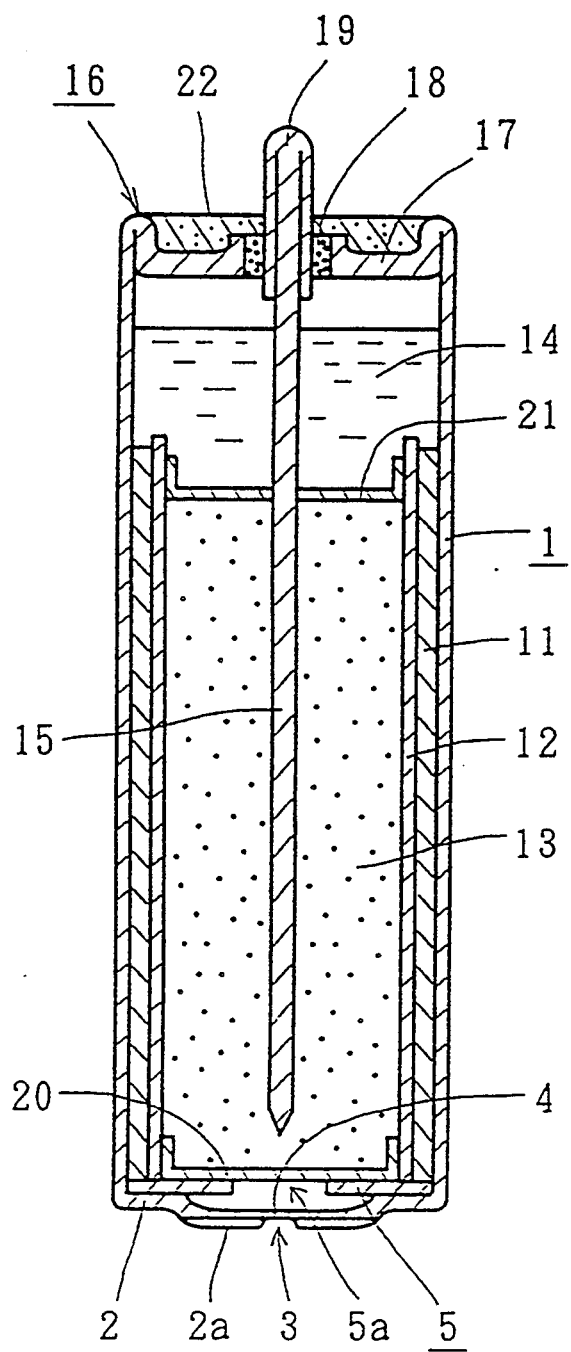
FIG. 2 is a longitudinal sectional view of an example of the hermetically sealed liquid active material cell according to the present invention.

FIG. 2 is a longitudinal sectional view of an example of the hermetically sealed liquid active material cell according to the present invention.

The cell of FIG. 2 comprises a cell container 1, which can be produced by drawing a stainless steel plate having a thickness of 0.2 to 0.5 mm to form a bottomed cylinder. A center part of the bottom 2 is protruded to form a protruded part 2a.

At the protruded part 2a of the bottom 2 of the cell container 1, grooves 3 are formed to provide a cross-formed thin-wall part 4a.

in the cell of the present invention, a resinous ring 5 is provided on an inner surface of the bottom of the cell container 1.

The resinous ring 5 can be made of any resin which is resistant to the oxyhalide which is used in the electrolyte liquid. Examples of such resin are fluororesins such as polytetrafluoroethylene, ethylene-tetrafluoroethylene (ETFE) copolymer resin, and polychlorotrifluoroethylene (CTFE).

A thickness of the resinous ring 5 is not critical. Usually, the thickness is at least 0.05 ram, preferably at least 0.2 mm to provide ease of handling when the ring 5 is inserted in the cell container 1. There is no limit on the maximum thickness. When the ring 5 is excessively thick, an the amount of the filled active material is decreased. Preferably, the thickness of the resinous ring does not exceed about 1 mm.

The negative electrode 11 is formed by preparing a cylinder from a sheet of an alkali metal such as lithium, sodium or potassium, or alloys thereof and contact bonding the cylinder to an inner peripheral surface of the cell container 1.

The separator 12 is made in cylinder form of a nonwoven fabric of, for example, glass fibers or the ethylene-tetrafluoroethylene copolymer fibers. The separator 12 separates the negative electrode 11 and the positive electrode 13.

The positive electrode 13 is made of a resinous porous material cylindrically molded body comprising acetylene black as a main component, graphite and polytetrafluoroethylene.

The electrolyte liquid 14 comprises the oxyhalide which is in the liquid state at room temperature (e.g., a thionyl chloride, sulfuryl chloride, phosphoryl chloride, etc.) as a solvent, and an electrolyte dissolved therein. Since the oxyhalide, which is the positive electrode material, serves as the solvent in the electrolyte liquid, a comparatively large amount of the electrolyte liquid 14 is contained in the cell, which is different from other type cells.

As understood from the use of oxyhalide as the positive electrode material, the positive electrode 13 itself does participate in the reaction. Rather, the positive electrode 13 provides a place where the oxyhalide and alkali metal ions which are liberated from the negative electrode 11 react with each other.

The positive current collector 15 comprises a nickel rod. As explained above, the cell lid 16 comprises the body 17, the insulating layer 18 and the positive terminal 19. The body 17 is usually made of stainless steel. Its upstanding periphery is bonded to the opening edge of the cell container 1 by welding. The insulating layer 18 is usually made of glass and provided on the inner periphery of the body 17. The insulating layer 18 insulates the positive terminal 19 from the body 17. Further, its outer peripheral surface is melt bonded to the inner peripheral surface of the body 17 to hermetically seal a gap between the body 17 and the positive terminal 19.

The positive terminal 19 is usually made of stainless steel. In the assembling step of the cell, a part of the positive terminal 19 is in the form of a pipe, and the electrolyte liquid is poured into the cell container through the pipe. After pouring the electrolyte liquid, the pipe part of the terminal 19 is welded to the upper part of the positive current collector 15 to close the opening.

The bottom insulating material 20 is usually made of a nonwoven fabric of glass fibers like the separator 12, and prevents contact between the positive electrode 12 and the cell container 1. The upper insulating material 21 is also made of the nonwoven fabric of glass fibers, and prevents the direct contact of the positive electrode 13 and the body 17 of the cell lid 16 which also serves as the negative terminal.

The resin layer 22 is made of a resin, for example, an epoxy resin and prevents short circuit caused by water droplets which are collected on the upper part of the cell lid 16.

The above explained materials of the parts of the cell are examples and materials of the cell parts are not limited to them.

In the cell of the present invention, the oxyhalide which is in the liquid state at room temperature (for example, 25° C.) such as thionyl chloride, sulfuryl chloride, phosphoryl chloride, and the like is used as the positive active material.

The oxyhalide is used also as the solvent in the electrolyte liquid. That is, the electrolyte liquid is prepared by dissolving the electrolyte material (e.g., $LiAlCl_4$, $LiAlBr_4$, $LiGaCl_4$, $LiB_{10}Cl_{10}$, etc.) in the oxyhalide. In the preparation of the electrolyte liquid, the electrolyte, for example $LiAlCl_4$, may be formed by adding $LiCl$ and $AlCl_3$ in the oxyhalide. $LiAlCl_4$ is present in the oxyhalide in the ion form of $Li^+$ and $AlCl_4$.

Except for the insertion of the resinous ring, the cell of the present invention may be assembled in the same manner as the conventional hermetically sealed liquid active material cell.

PREFERRED EMBODIMENTS OF THE INVENTION

The present invention will be explained further in detail by the following Examples, which are not intended to limit the scope of the present invention in any way.

EXAMPLE

Figure 1:
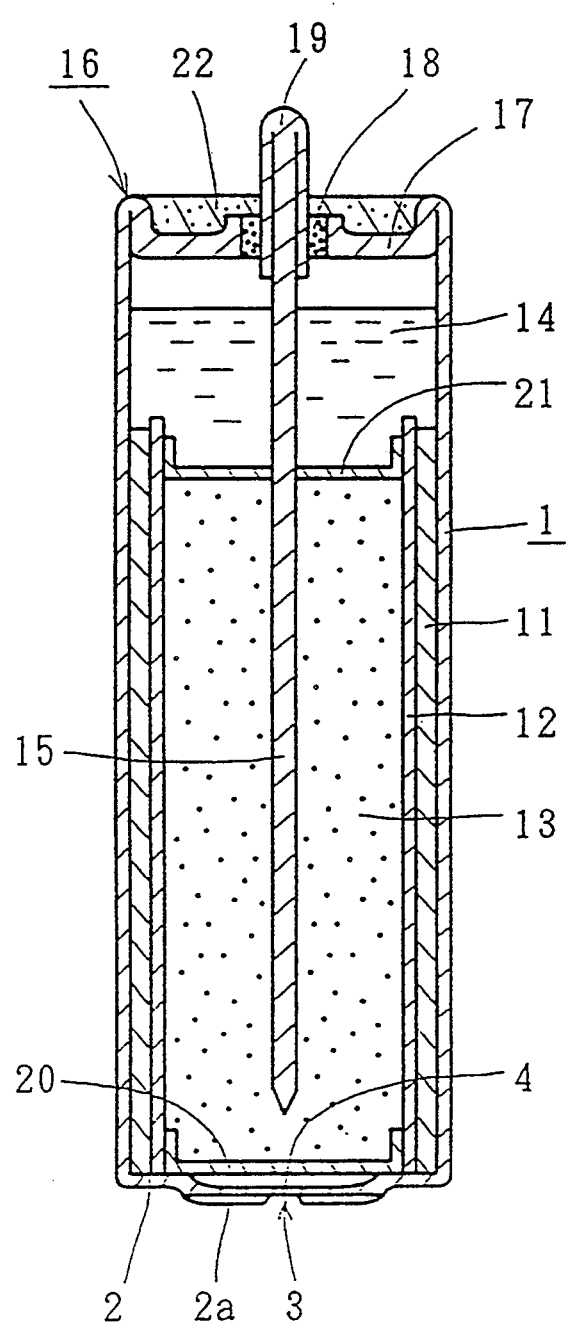
FIG. 1 is a longitudinal sectional view of a conventional hermetically sealed cell comprising a liquid active material.

A thionyl chloride-lithium type hermetically sealed liquid active material cell having the structure of FIG. 1 was prepared. It had an outer diameter of 14 mm and a height of 50 min.

The cell container 1 was made of a stainless steal thin plate having a thickness of 0.3 mm, and had a thin-wall part in the cross form having a thickness of 0.07 mm, which was formed by forming the grooves 3 each having an up-side-down trapezoid cross section in the protruded parts 2a of the bottom 2.

The resinous ring 5 was made of an ethylene-tetrafluoroethylene copolymer resin and had a thickness of 0.4 mm, an outer diameter of 12.8 mm and an inner diameter of 4 min. The ring 5 was placed on the inner surface of the bottom 2.

The negative lithium electrode had a weight of 530 mg and its theoretical electric capacity was 204 mAh.

The positive electrode contained 893 mg of acetylene black, and a poured amount of the electrolyte liquid was 4 ml. The theoretical electric capacity of thionyl chloride as the positive active material was about 2640 mAh.

COMPARATIVE EXAMPLE

In the same manner as in Example 1 except that no resinous ring was used, a hermetically sealed liquid active material cell was prepared. The thickness of thin-wall parts was 0.07 mm also.

Each of 40 cells of Example and Comparative Example were dropped in a solder bath kept at 260±10° C. Then, whether or not the cells burst in the solder bath was checked.

The bursting was checked by the following criteria:

A cell which did not burst by the normal actuation of the explosion-proof mechanism meant a cell in which the thin-wall parts were broken within several ten seconds from the dropping of the cell in the solder bath, and from which the electrolyte liquid leaked out simultaneously with the breakage of the thin-wall parts, while the cell contents such as the positive and negative electrodes remained in the cell. A cell which exploded meant a cell in which the thin-wall parts were broken within several ten seconds from the dipping of the cell in the solder bath and, at the same time, from which the cell contents were mixed together with the molten solder, accompanied by a loud bursting noise.

Among the forty cells tested of Example 1, no cell burst, while eleven cells burst among the forty cells of the Comparative Example. These results indicate that the thin-wall explosion-proof mechanism normally functioned in the cells of the Example, and the none of cells burst when they were dropped in the solder bath.

Figure 3:
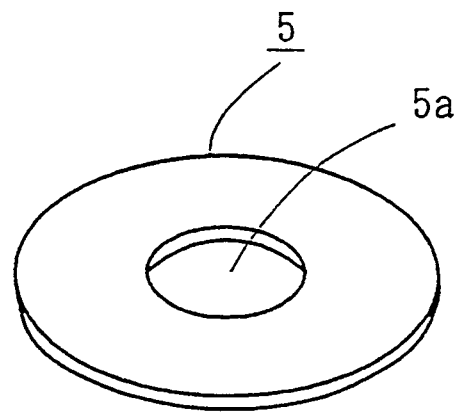
FIGS. 3-8 are perspective views of several examples of the resinous ring used according to the present invention.

In the above Examples, the resinous ring having a shape of FIG. 3 was used, in which the center hole 5a is round.

Figure 4:
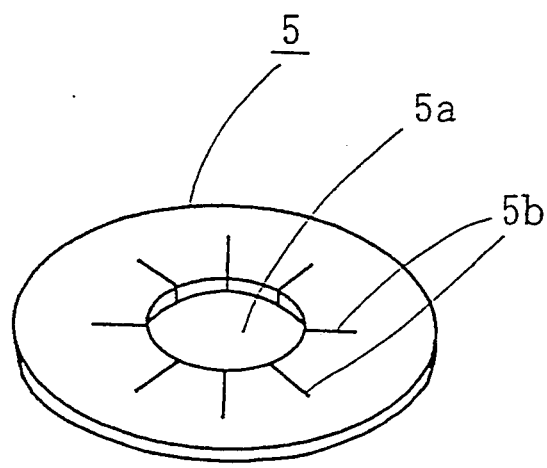
Figure 5:
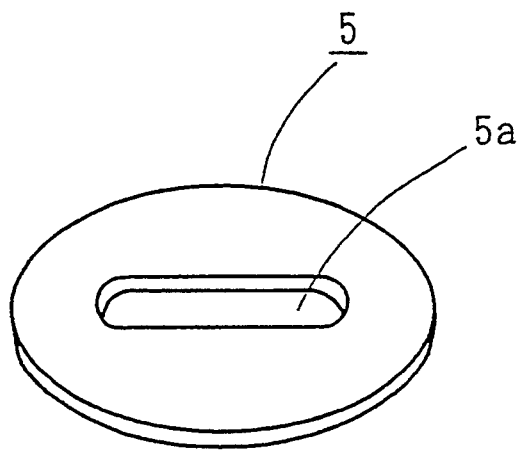
Figure 6:
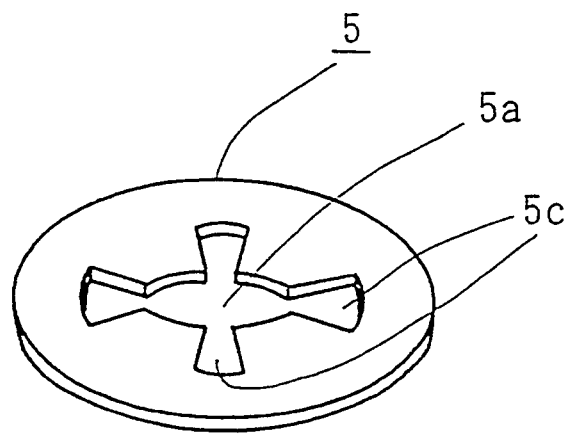
Figure 7:
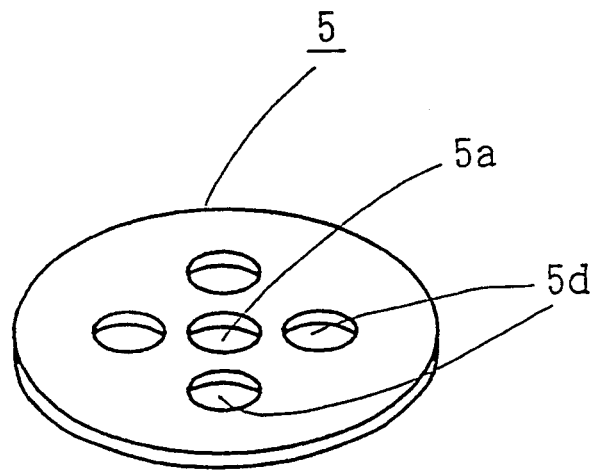

As the resinous ring, various types of rings may be used. For example, the ring may have radially formed slits 5b, as shown in FIG. 4. The center hole 5a may be in the form of ellipsoid as shown in FIG. 5, or may have protruded parts 5c, as shown in FIG. 6. Further, plural holes 5d may be provided around the center hole 5a.

Figure 8:
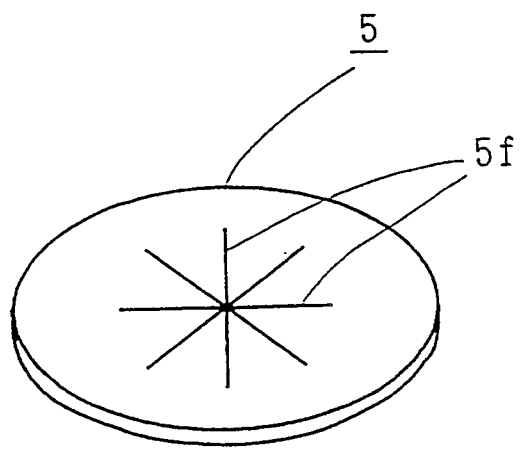

Alternatively, as shown in FIG. 8, plural slits 5f are radially formed, and the center part is opened when the pressure is applied thereto to form the center hole The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hermetically sealed liquid active material cell cell comprising a cell container which has a thin-wall part at the bottom thereof for explosion-proofing, an electrolyte liquid comprising an oxyhalide compound which is in an liquid state at room temperature as a positive active material, a negative electrode which comprises at least one alkali metal, a positive electrode, a separator for separating the negative electrode and positive electrode, a positive current collector, and a hermetic seal which closes an opening of the cell container, wherein said cell further includes a resinous ring on an inner surface of the bottom of said cell container.

2. The hermetically sealed liquid active material cell according to claim 1, wherein said resinous ring is made of a fluororesin.

3. The hermetically sealed liquid active material cell according to claim 2, wherein said fluororesin is at least one resin selected from the group consisting of polytetrafluoroethylene, ethylene-tetrafluoroethylene copolymer resin and polychlorotrifluoroethylene.

4. The hermetically sealed liquid active material cell according to claim 1, wherein said resinous ring has a thickness of at least 0.05 mm.

5. The hermetically sealed liquid active material cell according to claim 4, wherein said resinous ring has a thickness of at least 0.2 mm.

6. The hermetically sealed liquid active material cell according to claim 1, wherein said resinous ring has a thickness not to exceed 1 mm.

* * * * *